United States Patent [19]
Donham

[11] 3,880,764
[45] Apr. 29, 1975

[54] POLYMER NON-DISPERSED DRILLING FLUIDS

[75] Inventor: James E. Donham, Houston, Tex.

[73] Assignee: Amoco Production Company, Tulsa, Okla.

[22] Filed: Nov. 6, 1972

[21] Appl. No.: 304,027

[52] U.S. Cl......... 252/8.5 A; 252/8.5 B; 252/8.5 C; 175/65
[51] Int. Cl............................................. C10m 3/40
[58] Field of Search......... 175/65; 252/8.5 A, 8.5 C, 252/8.5 B

[56] References Cited
UNITED STATES PATENTS

| | | | |
|---|---|---|---|
| 3,081,260 | 3/1963 | Park | 252/8.5 A |
| 3,323,603 | 6/1967 | Lummus et al. | 252/8.5 C |
| 3,338,320 | 8/1967 | Gilson et al. | 252/8.5 C |
| 3,346,488 | 10/1967 | Lyons et al. | 252/8.5 C |
| 3,434,970 | 3/1969 | Siegele et al. | 252/8.5 C |
| 3,472,325 | 10/1969 | Lummus | 252/8.5 C |
| 3,654,151 | 4/1972 | King et al. | 252/8.5 C |

FOREIGN PATENTS OR APPLICATIONS

| | | | |
|---|---|---|---|
| 717,460 | 9/1965 | Canada | 252/8.5 A |

Primary Examiner—Benjamin R. Padgett
Assistant Examiner—E. A. Miller
Attorney, Agent, or Firm—Paul F. Hawley; Arthur McIlroy

[57] ABSTRACT

Polymer non-dispersed low solids drilling fluids can be prepared to tolerate high calcium and salt concentrations by incorporating therein an effective amount of triamino dihexylene pentakis phosphonic acid, tetramino trihexylene hexakis methylene phosphonic acid, salts thereof, or mixtures of the acids or salts.

10 Claims, 2 Drawing Figures

(1) LOW SOLIDS-AVG. MUD WT. 8.5
(2) ADDITIVE ADDITIONS-AVG. MUD WT. 8.6
(3) ADDITIVE TREATED INTERVAL-AVG. MUD WT. 8.7
(4) SODA ASH TREATED INTERVAL-AVG. MUD WT. 9.0
(5) DISPERSED-AVG. MUD WT. 9.3

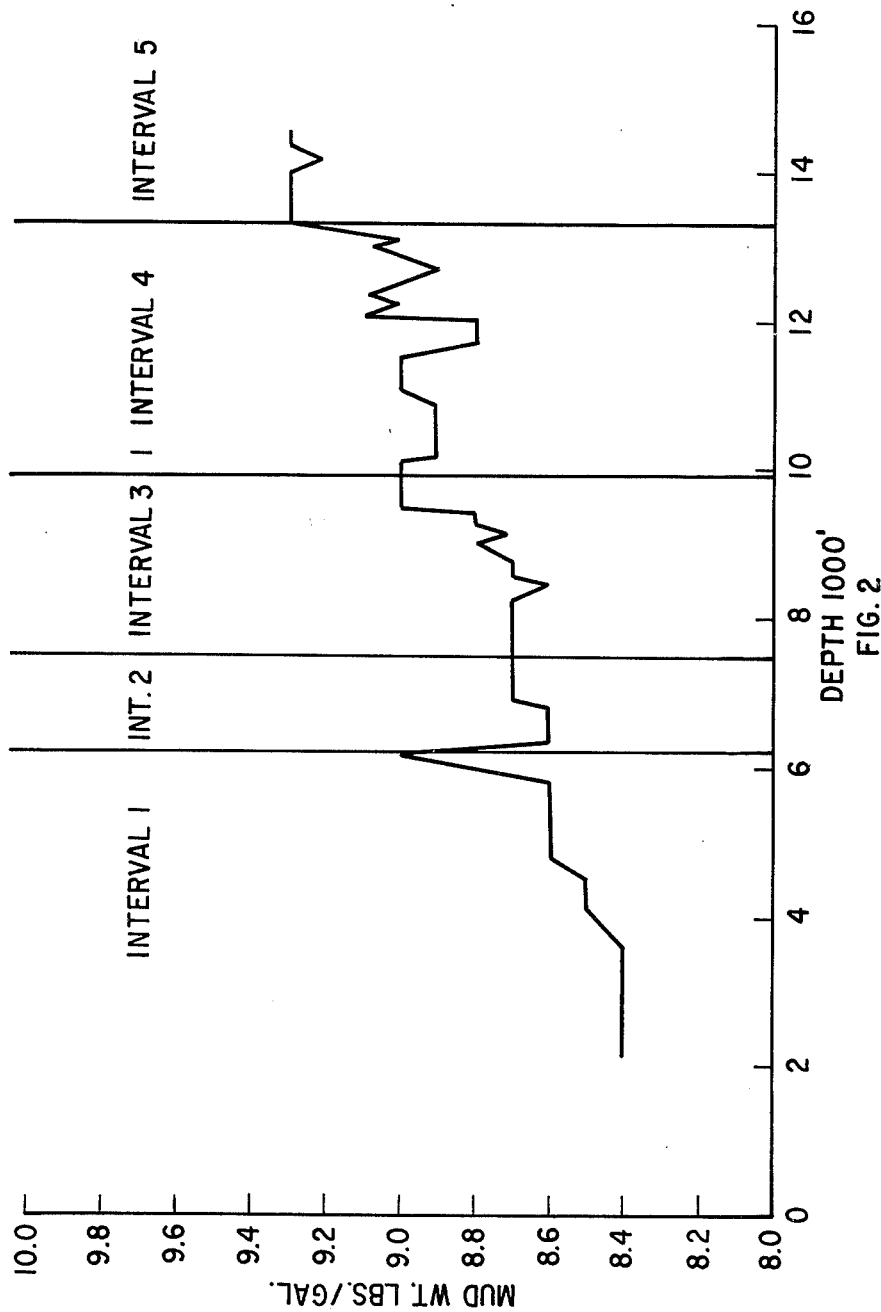

POLYMER NON-DISPERSED DRILLING FLUIDS

The present invention relates to novel drilling fluids and to their use in environments previously considered unsuitable for such fluids. More particularly, it relates to use of amino alkyl phosphonic acids in conventional weighted or unweighted polymer non-dispersed drilling fluids to render the latter useful in the presence of high calcium and salt concentrations.

BACKGROUND OF THE INVENTION

The use of low solids polymer non-dispersed muds is widely accepted as a valuable adjunct to optimized drilling techniques to allow optimum hydraulics, borehole stability and maximum penetration rates.

Polymer non-dispersed muds are applicable to a wide range of conditions encountered in drilling, both in weighted and non-weighted systems. Their unique drilling properties are due to the maintenance of low drilled solids content and optimum flow characteristics, allowing maximum advantage to be realized from computerized hydraulic programs, bit weight-rotary speed calculations and optimized bit selection. The desired properties are obtained by utilizing the chemical and physical characteristics of high molecular weight, long chain organic polymers. These polymers are used to simultaneously extend the use of bentonite and flocculate drilled solids, and to lower the fluid loss and alter drilling fluid flow properties without dispersing the drilling fluid.

The long chain high molecular weight polymers perform a dual function — extension of bentonite and flocculation of drilled solids and accordingly are referred to as "dual-action polymers." Bentonite extension, or increasing the viscosity of a bentonite suspension, is achieved by the active charged sites on the polymer chain reacting with charged sites on bentonite platelets and creating a large polymer-clay structure that is more viscous than an equivalent amount of bentonite without the polymer. Drilled solids flocculation is carried out by the active sites on the polymer chain reacting with the less highly charged (compared to bentonite) drilled solids and gathering them into a dense mass that is much larger than the individual particles. This denser structure settles according to Stoke's Law. A typical slurry of 7 lbs/barrel bentonite and 0.025 lb/barrel of the polymer in water will yield more viscosity than 14 lbs/barrel bentonite without the polymer. This allows a drilling fluid to be formulated with a lower solids content, thereby increasing the drilling rate without sacrificing the hole-cleaning due to viscosity and yield value of the drilling fluid. The effective size of the particles in the drilling fluid is much larger due to the presence of the polymer-clay structure, rather than dispersed bentonite platelets of colloidal size. Selective flocculation of drilled solids by the polymer also prevent their buildup in the system. The absence of colloidal solids is the reason for the much higher drilling rates obtained with polymer non-dispersed muds.

It is well known that colloidal solids are detrimental to penetration rate. Colloidal solids of less than 1 micron in size are the worst offenders because of their property of forming an instantaneous filter cake along the fracture planes induced by the bit striking the formation. This filter cake effectively seals the crevice surrounding the freshly broken chip and prevents entry of the turbulent flow of drilling fluid jetting from the bit. The chip hold-down pressure is sufficiently strong (due to pressure caused by hydrostatic differential) to prevent the chip being washed away by the fluid stream. The chip must be struck again and fractured into smaller particles before being swept away by the jet stream. Cuttings size is smaller. The drilling fluid weight increases, also reducing drilling rates.

The contribution of these smaller solids to plastic viscosity, yield values and gel strength is disproportionally large and also exerts a drastic reduction in penetration rate; so maintenance of the drilling fluid in a non-dispersed, low-solids state is highly advantageous to the drilling of the well.

A typical low solids non-dispersed mud contains the following ingredients:

1. Sodium montmorillonite (bentonite) — 2–14 lbs/bbl.
2. Alkali metal salt (preferably sodium, potassium or ammonium) of a high molecular weight (1 to 12 million) partially hydrolyzed polyacrylamide-polyacrylate copolymer for selectively flocculating drilled solids and exerting some effect on viscosity properties; usually lower gel strength and yield points; 0.01–0.5 lbs/bbl.
3. Alkali metal salt of a high molecular weight 3–12 million mole weight polyacrylate for extending the bentonite viscosity —0.01–0.5 lbs/bbl.
4. A low molecular weight polyacrylic acid, or an alkali salt of a low molecular weight polyacrylate (usually less than 100,000 mole weight) for controlling fluid loss and assisting in controlling high viscosities, yield values, and gel strengths contributed by the bentonite and by the bentonite-polymer structure — 0.25 – 5.0 lbs/bbl.
5. Fresh water.

Note: Items 2 and 3 may be added as a blend of the two polymers to simultaneously achieve both bentonite extension and solids flocculation; 2 may be added alone in areas where natural bentonite deposits being drilled would cause viscosities to be too high when the extending polymer is added.

The general practice of the industry is to use these polymer non-dispersed muds in as many areas as possible to decrease drilling costs, contingent upon a favorable drilling environment for utilizing this type of drilling fluid.

Low solids non-dispersed polymer muds have some limitations in areas of use. High calcium content, e.g., in excess of about 100 ppm, has an adverse effect, because of formation of calcium bentonite and reacting with the polymer. High chloride content, e.g., in excess of about 5,000 ppm, has a detrimental effect due to dehydration of the polymer-clay structure. The practice is to treat out calcium with soda ash, caustic, or barium carbonate, and pre-hydrate the polymer-bentonite slurry when high salt conditions are encountered. If salt and calcium is too high, then the system is usually dispersed or converted to a salt water mud, thereby losing the high penetration rates and other advantages offered by polymer non-dispersed muds.

Naturally occurring formations of bentonitic shales also normally limit the use of low solids non-dispersed muds, particularly in combination with anhydrite or other calcium-containing strata. When these formations are drilled they usually cause a rapid buildup of solids in the drilling fluid, which do not settle out and are reground into colloidal size. Anhydrite formations often underlie these, and the calcium contamination then causes excessive viscosity. These adverse conditions are particularly detrimental to a polymer non-dispersed mud that has been weighted with barium sulfate.

The addition of barite to increase drilling fluid weight adds inert solids that can alter the flow properties of the system. Yield values and gel strengths may be higher than desired, particularly in the presence of calcium contamination, mud-making shales, and salt. These viscosity problems have been reported in driling fluids using the high molecular weight polyacrylate and partially hydrolyzed polyacrylamide-acrylate copolymer blend previously referred to, but can occur in polymer non-dispersed muds using other polymers for bentonite extension.

When these problems occur, the practice is to add a dispersant or thinner to achieve manageable lower viscosities, yield values, and gel strengths. This is a self-defeating mechanism, because the dispersion of the small particles into even smaller ones makes their removal even more difficult, increases the chip holddown and keeps the cycle going. The only way to handle the situation then is to run large quantities of water, add large amounts of bentonite to maintain desired properties, and use enough dispersant or thinner to reduce yields and gel strength caused by the drilled solids and added bentonite. Sodium hydroxide and sodium carbonate are added to react with and treat out the calcium contamination. A thinner or dispersant functions by adsorbing onto exposed edges of clay lattices and neutralizing attraction of edge valances between particles. Flocculated clumps are broken up and new surfaces are created by separating aggregated or stacked sheets of clay. The number of individual clay particles is increased and particle size is decreased, resulting in increased plastic viscosity and lower drilling rates. Phosphates, tannins, and lignosulfonates are commonly employed as the thinner or dispersant. The addition of a dispersant results in decreased yield values and gel strength, but increased plastic viscosity due to breaking up aggregates and flocculated clumps of clay into colloidal particles. Since there are many areas in which the previously described conditions prevail, the use of low solids polymer non-dispersed muds has been limited to only those areas favorable to their use.

DESCRIPTION OF THE DRAWINGS

FIG. 2 is a plot involving the same well as represented by the solid line in FIG. 1, indicating the mud weight during the drilling operation. The additive (a mixture of triamino dihexylene pentakis methylene phosphonic acid and a tetramino trihexylene hexakis methylene phosphonic acid in which the former was present in a ratio of 3 moles to 1 mole of the latter) was employed in a polymer non-dispersed, low solids drilling fluid for the major portions of intervals 2 and 3. The well using the drilling fluid claimed herein and whose drilling rate is shown by the solid curve in FIG. 1 demonstrated a striking increase in penetration rate due entirely to the ability to maintain a polymer non-dispersed mud in this field where previously it had been impossible to use this type of fluid. Protection of the system through most of intervals 2 and 3 as shown in FIG. 2 was made possible by use of the additive during drilling of the troublesome shale and anhydrite formations. In this operation, viscosities, yield strengths, solids content and mud weight were almost optimum for a non-dispersed mud and well below those of a typical dispersed mud.

SUMMARY OF THE INVENTION

Figure 1:
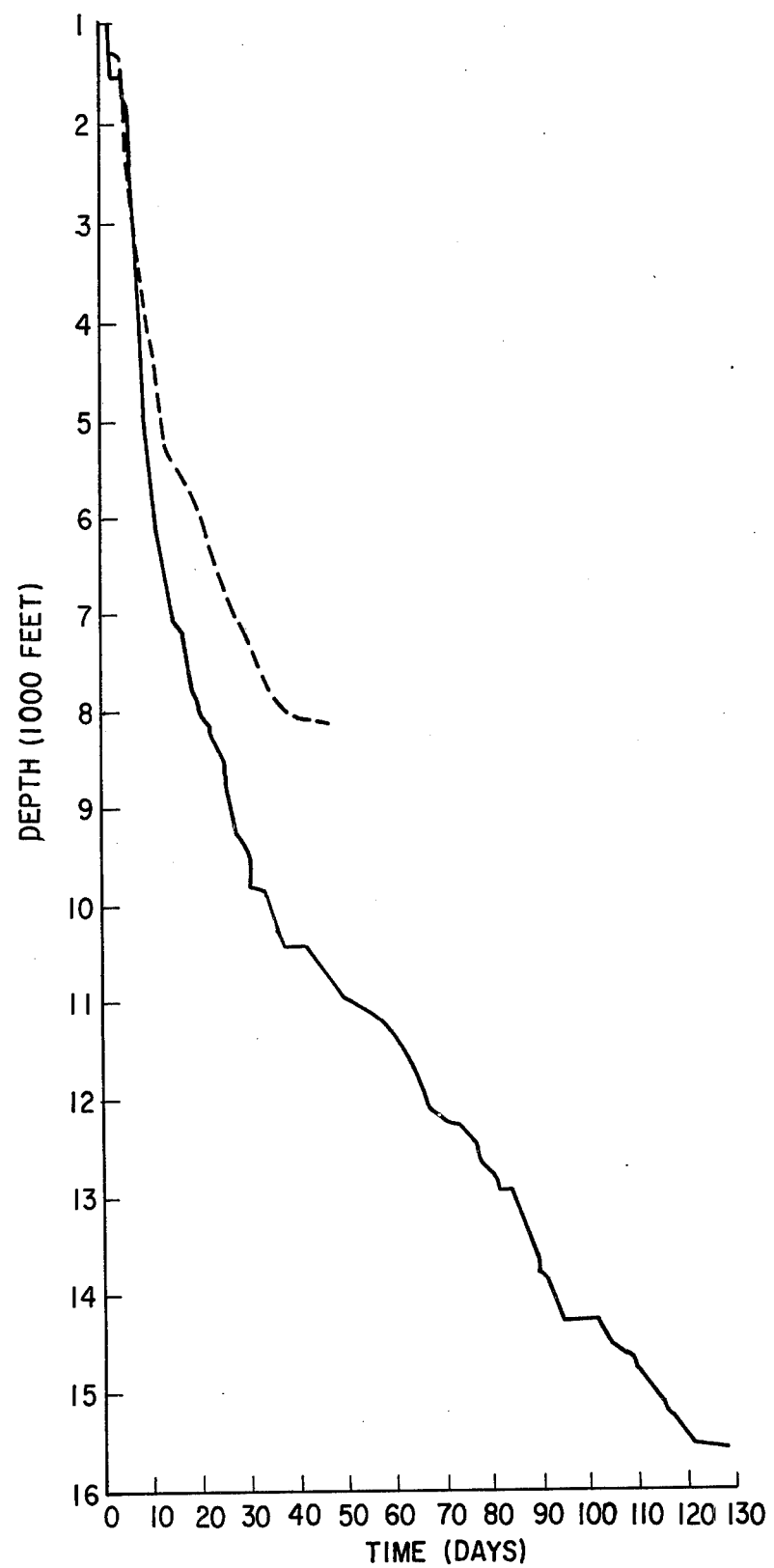
FIG. 1 of the drawings is a plot showing the difference in drilling rates in formations containing bentonitic shales and high concentrations of calcium and salt. The dashed line represents the drilling rate obtained using a dispersed mud, while the solid line indicates the results obtained with the drilling fluid of my invention.

I have now discovered an additive for polymer non-dispersed muds capable of rendering them useful in drilling types of formation previously regarded by the industry to be unsuitable for such muds. I have further observed that when this additive is present in these muds and used in areas in which they previously have been considered inoperable, said muds still retain all the desirable features of low solids drilling fluids. Specifically, I have found that the addition of a mixture of certain amino methylene phosphonic acids or alkali metal salts thereof to a typical polymer non-dispersed mud, the latter generally containing a clay such as bentonite, polyacrylates and a dual-action polymer or the equivalent, results in a system that is highly resistant to the ordinary harmful effects of calcium and salt contamination, and reduces viscosity buildup due to drilled solids. As previously mentioned, dispersed muds are normally used where substantial calcium and salt concentration are anticipated. This, together with the fact that conventional polymer non-dispersed systems are ordinarily unstable in such an environment, renders totally unexpected the application of the drilling fluids of my invention in high calcium and/or salt systems. The effect of my new additive in a typical low solids drilling fluid is to lower viscosities, yield values and gel strengths without dispersing or deflocculating the system.

Since polymer low solids non-dispersed muds depend upon the maintenance of clay-polymer structures or aggregates and controlling the attractive forces between these structures, a thinner, dispersant or deflocculant will render the non-dispersed mud ineffective and change it to a dispersed state.

The additives of my invention neither disperses nor deflocculates the polymer non-dispersed mud. Although the mechanism is not exactly known, laboratory data indicate that my additive functions by destroying the attractive forces between the polymer-clay aggregates without affecting the integrity of the polymer chain-bentonite platelet structure. The organic high molecular weight phosphonate is of sufficient ionic strength to neutralize the edge valence attractions on the exposed bentonite platelets, but is not of sufficient strength to displace the bentonite platelets from the polymer chains. The phosphonate molecule is of sufficient length to align itself along the polymer-clay structure, and neutralize several edge valences.

The new structure, composed of the polymer-bentonite platelet "chain" aligned with a molecule of my additive, is highly resistant to invasion by calcium ions into the polymer-clay structure. The molecular size of this additive is too great to diffuse into the interplanar area of the clay molecule. It ionizes to give $H^+$ ions; these displace some mono- and di-valent cations inside the clay lattice, thereby giving lower viscosity by decreasing the inter-planar distances and reducing the standoff distance; this releases water from the clay/polymer aggregate and lowers viscosity. The polymer/clay aggregates bind more water than clay alone. There is no breakup of polymer/clay aggregates, as is true with a thinner or dispersant. The effect is to lower gel strength by reducing inter-aggregate attractive-repulsive forces, destroying the equilibrium condition. Plastic viscosity is lowered because the particle size distribution is shifted toward larger particles. A dispersant acts in the opposite manner. Yield values are unchanged or lowered only slightly, because attractive/-repulsive forces between individual clay platelets are relatively unaffected.

As previously stated, the additives of my invention may be used in combination with any conventional polymer-non-dispersed low solids muds, and preferably are used in combination with a relatively low molecular weight polyacrylate for best results as will be commented on in more detail below. The polyacrylates employed for fluid loss prevention may be any of those ordinarily used for this purpose. However, in general I prefer those having a molecular weight not in excess of about 100,000—for example, from about 50,000 to 100,000. These materials, which are generally preferably used in the form of their alkali metal salts, may also be employed in the form of the corresponding free acid and produce optimum results, insofar as concerns yield values, gel strengths and fluid loss, in concentrations of from about 0.1 to 3.0 lbs/barrel of drilling fluid.

In the drilling fluid systems contemplated, I may use a combination of materials for obtaining proper solids flocculation, control of yield values and gel strengths on the one hand, and for extending the viscosity of the clay material, such as bentonite, on the other. Thus, for solids flocculation and control of yield values and gel strengths I may employ a high molecular weight, e.g., 1–12 million, partially hydrolyzed polyacrylamide-polyacrylate copolymer alkali metal salt, also preferably in concentrations ranging from 0.005 to 0.5 lb/bbl of mud. The partially hydrolyzed polyacrylamide-polyacrylate copolymer, while it may vary in ratio of free acid groups to amide groups, the polyacrylamide preferably has from about 2 to 10 percent of its amide groups hydrolyzed. For bentonite extension I may use a high molecular weight, e.g., 1–12 million, polyacrylate alkali metal salt or the corresponding polyacrylic acid in amounts ranging, typically, from about 0.005 to 0.5 lb/barrel. A synergistic blend of the copolymer and polyacrylate may be employed as a dual-action mixture, such as for example, the mixture described in U.S. Pat. No. 3,472,325.

As a substitute or equivalent of the combination polyacrylate salt and partially hydrolyzed polyacrylate-polyacrylamide for flocculation and bentonite extension, I may use other materials known to possess similar characteristics such as, for example, the vinyl maleic copolymer described in U.S. Pat. No. 3,070,543 for such uses. Such substances are genereally referred to as "dual-action polymers."

The amino alkyl phosphonic acids or salts thereof suitable for use in preparing the drilling fluids of my invention are triamino dihexylene pentakis methylene phosphonic acid and tetramino trihexylene hexakis phosphonic acid. While these compounds may be used to advantage separately to produce the novel drilling fluidis of my invention, I prefer to employ a mixture of these two wherein a major amount of the triamino derivative is present, for example, in a ratio of from about 3 moles of the triamino to about 1 mole of the tetramino compound. This group of compounds is disclosed in U.S. Pat. No. 3,346,488 and a method for their preparation is given therein. While the quantity of this additive used in accordance with my invention may vary rather widely, I generally prefer to employ it in concentrations ranging from 0.05 to about 0.5 lb/barrel. This material preferably is added to the circulating mud and generally is added at a rate such that the desired concentration is obtained in the system after not more than about two or three complete circulations. For the purpose of this description, when referring to these compounds as "the additive" or "an additive" such term is intended to include each one of the above-named compounds separately or in combination in the free acid or salt form. In preparing the latter any of the common amines such as ethanol amine, ethyl amine, butyl amine, hexyl amine, etc., may be used in addition to suitable alkali metal compounds.

The properties of typical polymer non-dispersed low solids muds with and without the additive claimed herein are shown in the Table I below and were determined from a 15 lb non-dispersed laboratory mud containing about 335 lbs of bariet/bbl and other ingredients in the amount shown below, and a 10.5 lb field mud.

TABLE I

| System | Blend of Partially Hydrolyzed Copolymer of Polyacrylate-Polyacrylamide* and Sodium Polyacrylate** | Sodium Polyacrylate*** | Additive | Bentonite |
|---|---|---|---|---|
| 1 | 0.115 lb/bbl | 0 | 0 | 9.0 lb/bbl |
| 2 | 0.115 lb/bbl | 2 lb/bbl | 0 | 9.0 lb/bbl |
| 3 | 0.115 lb/bbl | 3 lb/bbl | 0 | 9.0 lb/bbl |
| 4 | 0.115 lb/bbl | 2 lb/bbl | 0.25 lb/bbl | 9.0 lb/bbl |
| 5 | 0.115 lb/bbl | 3 lb/bbl | 0.25 lb/bbl | 9.0 lb/bbl |
| 6 | 0.115 lb/bbl | 0 | 0.25 lb/bbl | |

*Mol weight about 2–4 million
**Mol weight about 12 million
***Mol weight about 100,000

Mud Properties:

| System | Apparent Viscosity | Plastic Viscosity | Yield Point | Gel Strength | Fluid Loss | Cake 32nd" | pH |
|---|---|---|---|---|---|---|---|
| 1 | 22 | 20 | 4 | 5/24 | 18.8 | 4 | 7.0 |
| 2 | 95 | 70 | 50 | 22/76 | 6.2 | 2 | 7.0 |
| 3 | 126 | 95 | 62 | 24/66 | 4.4 | 2 | 7.0 |
| 4 | 70 | 54 | 32 | 9/30 | 6.2 | 1 | 7.0 |
| 5 | 90.5 | 71 | 39 | 10/26 | 4.8 | 1 | 7.0 |
| 6 | 16.5 | 16 | 1 | 2/12 | 22.3 | 4 | 7.0 |

From the above Table it can be observed that the addition of sodium polyacrylate increases plastic viscosity, yield values and gel strengths (Systems 2 and 3). The addition of the additive lowers plastic viscosity, yield values and gel strengths (System 6). When the additive is incorporated in a system containing sodium polyacrylate (lower molecular weight) the plastic viscosity is reduced. A dispersant thinner invariably raises the plastic viscosity. It will be seen that the use of the additive alone (System 6 v. System 1) reduces plastic viscosity by 4 units or by about 20 percent. Incorporation of the additive to a system containing 2 lbs/barrel of the lower molecular weight sodium polyacrylate (System 2 v. System 4) reduces plastic viscosity by 16 units or about 23 percent. Addition to a system containing 3 lbs/barrel of such sodium polyacrylate (System 3 v. System 5) reduces plastic viscosity by 24 units or by 25 percent. Since the addition of increments of polyacrylate increases plastic viscosity, the observed increased percent reduction is unique and unexpected. The effect on yield point is also additive, i.e., 36 percent reduction with 2 lbs/barrel of sodium polyacrylate and 37 percent reduction with 3 lbs/barrel of sodium polyacrylate. The negligible effect on fluid loss with sodium polyacrylate and the actual increase in System 6 v. System 1 illustrates the true non-dispersive nature of the additive of my invention, i.e., it reduces plastic viscosity, yield values and gel strengths without dispersing or thinning the mud.

trol. Maintaining solids content at a low level had been impossible in the past, the muds were dispersed and attempts to use a polymer non-dispersed mud abandoned. These problems were due to the extremely unfavorable environment — a layer of bentonitic mud-making shales interspersed with layers of anhydrites.

The well was spudded and surface pipe set. Drilling out of surface was commenced four days later with gel-water. High molecular weight (2-4 million) copolymer additions were begun at a depth of 1,855 feet in order to maintain low drilled solids. An aqueous solution of the copolymer was added directly downstream of the shale shaker prior to entering the reserve pit. The amount of copolymer added resulted in a concentration of around .01 lb/bbl. Solids flocculation occurred immediately, with large flocs forming and settling rapidly. Mud weight at the pump suction was 8.4 lbs/gallon. Soda ash was also added during this period down to a depth of 6,399 feet to control calcium contamination. The calcium content was maintained at 20-40 ppm. Plastic viscosity and yield values ranged from 4-6 and 1-6, respectively, in this fast-drilling, mud-making interval. No materials were added at this stage to control fluid loss with rates running from 32.8 cc/30 minutes API at 2,695 feet down to 14.0 cc/30 minutes API at 6,000 feet. A mixture of high molecular weight (2-4 million) partially hydrolyzed polyacrylamide-polyacrylate copolymer and sodium polyacrylate (mo-

TABLE II

| System* | High Mole Weight Polyacrylate-Copolymer Blend | Additive |
|---|---|---|
| 1 | 0.04 lbs/bbl | 0 |
| 2 | 0.04 lbs/bbl | 0.2 |

*Made from 10.5 lb field mud, Ward County, Texas, containing about 72 lbs/bbl barite, 15 lbs/bbl bentonite.

| System | Apparent Viscosity | Plastic Viscosity | Yield Point | Gel Strength | Fluid Loss | Cake | pH |
|---|---|---|---|---|---|---|---|
| 1 | 14.5 | 10 | 9 | 25/40 | NA | NA | 9 |
| 2 | 10 | 8 | 4 | 2/18 | NA | NA | 9 |

From Table No. II it can be observed that the addition of the additive to a field mud results in lower plastic viscosity, yield value, and gel strength without dispersing, whereas a dispersant would have increased the plastic viscosity while lowering the gels and yield value.

PREFERRED EMBODIMENTS OF THE INVENTION

The following examples illustrate in further detail the effectiveness of the use of my additive in polymer non-dispersed low solids muds in environments previously considered unsuitable for such drilling fluids.

EXAMPLE 1

After laboratory testing was completed a full-scale test well was obtained to determine the effectiveness of the additive in rendering polymer non-dispersed muds resistant to calcium and/or salt concentration. The test well selected was located in the South Elk Basin field, Park County, Wyoming. Previous wells drilled in this area attempting to use polymer non-dispersed muds had been beset with problems caused by calcium contamination and high solids content. The shales encountered are bentonitic in nature and very difficult to conlecular weight 10-12 million) in an amount sufficient to produce a concentration in the mud after one circulation of from about .025 to about .05 lb/barrel was added at a depth of 4,431 feet to reduce bentonite requirements. The mud weight was maintained at 8.6 to 8.8 pounds per gallon, with a solids content of from ½ to 2½ percent. Penetration rates were high during this interval, with an average rate of 27.3 feet/hour in the 5,869-foot interval between surface and 6,399 feet. This compared to an 8.8 foot/hour average rate at approximately the same depth for the well wherein the drilling rate is shown in the dashed line of FIG. 1 in which a dispersant was being used.

Some tight hole problems were encountered at 6,061 feet and the mud was turned to the steel pits. Weight per gallon increased to 9.0 pounds and plastic viscosity and yield value increased to 16 and 18, respectively. Bentonite addition was discontinued, at which time the mud contained approximately 20 lbs/barrel. Additions of high molecular weight copolymer were increased to improve flow properties, i.e., the plastic viscosity-yield value ratio, and lower the solids content. The hole conditions cleared up and circulation through the reserve pit was resumed. During the time that circulation was in the steel pits, addition of the additive (in a ratio of 3 moles of the triamino dihexylene pentakis methylene phosphonic acid to 1 mole of the tetramino trihexylene hexakis methylene phosphonic acid) was begun to precondition the system prior to drilling the calcium-containing formations known to cause problems. Addition of the additive to the mud was begun at a depth of about 6,200 feet and incorporated therein at a rate such that after one complete circulation the system contained .21 lb/barrel. Gel strengths had begun to climb — up to this point gel strengths were 0-initial and 0-2 10 min. Prior to conditioning the system with the additive, gel strengths had climbed to 4-initial and 27 10 min with soda ash treatment. After incorporating the additive into the mud system, the weight came back down to 8.6 lbs/gallon. The plastic viscosity range was 8–10 and yield values ran 4–10. The calcium content ranged from 80–340 ppm, with no attempt to remove it. During the depth illustrated by interval 2, FIG. 2, no fluid loss control agent was added. Fluid loss ranged from 12–20 cc/30 min API.

At a depth of 7,500 feet, additions of the additive were discontinued, at which time the system contained .2 lb/barrel. During this 1,300-foot interval the maintenance of flow properties and fluid loss was achieved without addition of soda ash (although 5 sacks were inadvertently added at one point) and no sodium polyacrylate addition. Even after discontinuing the addition of the additive, the system remained in good condition up to a depth of about 9,500 feet. This will also be seen from the curve in FIG. 2 where the mud weight ranged from 8.6 lbs/gallon at 6,200 feet to about 8.8 lbs/gallon at 9,500 feet. The calcium content varied from 150 to 350 ppm, with no attempt being made to remove it, during which time the pH ranged from 7.8 to 8.0.

At a depth of 8,845 feet, low molecular weight (not in excess of 100,000) sodium polyacrylate treatment was begun, with fluid loss being reduced from 13.2 cc/30 min down to 6.4 cc/30 min API and was maintained below 10 cc. At 9,930 feet soda ash treatment was begun (mostly interval No. 4 shown in FIG. 2) and a conventional low solids non-dispersed mud was maintained from this point to a depth of 13,246 feet with mud weight averaging 9.0 lbs/gallon. Fluid loss was controlled 8–10 cc/30 min, with low molecular weight sodium polyacrylate. The concentration of additive at this time in the system was less than .05 lb/barrel. The pH was allowed to increase to 9.5 and ranged from 8–10.

The solids content increased from 3 percent for the additive - treated fluid in interval 3 of FIG. 2 to 5–6 percent for interval 4 (FIG. 2) for the soda ash treated interval. Mud weight increased from an average of 8.7 lbs/gallon to an average of 9.0 lbs/gallon during the soda ash treated interval. The use of soda ash to treat out calcium is a common practice. Addition of soda ash precipitates calcium as an insoluble, inert carbonate as shown by the equation:

$$Na_2CO_3 + CaSO_4 \rightarrow CaCO_3 + Na_2SO_4$$

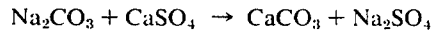

The sodium sulfate acts as a dehydrating agent the same as sodium chloride; sodium carbonate increases pH. Both of these factors tend to interfere with the stability of the polymer-clay structure that is the "backbone" of a polymer non-dispersed mud. Use of the additive in this system did not contribute to the problem. The additive does not raise the pH or react to form an inorganic salt. It stabilizes the polymer-clay structure by displacing cations from the polymer chain and bentonite platelets and forming a protective "layer" adjacent the polymer-clay structure. By modifying electrical charges and releasing some water of hydration at the interface between polymer-clay structures, reduction in gel strengths, yield values and plastic viscosity was achieved without dispersing, and plastic viscosity-yield value ratios were maintained at optimum levels.

A conventional dispersant such as, for example, a lignosulfonate, added to a non-dispersed polymer mud destroys the clay-polymer structure by neutralizing all the charges along the polymer "backbone" and on the bentonite platelets. The plastic viscosity increases, yield point drops drastically and solids buildup almost invariably occurs. Fluid loss is lowered considerably by dispersing all the large structures to colloidal, submicron-sized particles. This phenomenon was strikingly evident when the mud system in the test well (see FIG. 2) was dispersed at 13,246 feet. Plastic viscosity had been running from 19–25, averaging around 20 and the plastic viscosity-yield value ratio was about 1:1 in the interval (3) preceding the dispersed interval (4, FIG. 2). Gel strengths were 2-inital and 10–25 10 mins. Solids content averaged 5 percent, with mud weight at 8.8 to 9.0 lbs/gallon.

After dispersing, the plastic viscosity went to 36 and averaged around 35. The plastic viscosity-yield value ratio rose to around 2:1 and gel strengths were 2-initial and 5–10 10 min. Solids content rose to 9 percent and averaged 8.5 percent. Mud weight climbed to 9.3 lbs/gallon, accompanied by a decline in drilling rate from 5.6 to 3.5 feet/hour. A computerized run was made and predicted that during the 1,284-foot dispersed interval, a penetration rate of 3.71 feet/hour could have been realized if the mud had not been dispersed instead of the actual rate of 3.09 feet/hour. The savings would have been $5.17/foot or $6,803.60 for the interval, a 15.7 percent reduction in cost.

EXAMPLE 2

After completion of the well involved in Example 1, another test was made to evaluate the effectiveness of the additive in a weighted (15 lbs/gallon) non-dispersed mud. This well was drilled in West Texas in an area where it had been determined that the use of the polymer blend for bentonite extension resulted in excessive yield points and gel strengths. Previous attempts with such treatment had resulted in failures. Initially the drilling fluid employed consisted essentially of fresh water, bentonite (10 lbs/barrel), a polymer blend of partially hydrolyzed polyacrylamide-polyacrylate copolymer (molecular weight 2–4 million) and high molecular weight (10–12 million) polyacrylate (.2 lb/barrel) and a low molecular weight (75,000) polyacrylate (1 lb/barrel).

The well was watched closely and additive was incorporated in the drilling fluid whenever gel strengths rose to undesirable levels. Usually the additive was employed in concentrations of about .2 to .25 lb/barrel. On incorporation of the additive into the system, the gel strength would decrease to a manageable level and no further additive was used until gel strengths increased again whereupon the procedure was repeated.

The result was that no problems occurred and the weighted non-dispersed mud was run with good results in an area where previous attempts to use the polymer blend to maintain non-dispersed properties had failed.

From the foregoing description it will be apparent to those skilled in the art that the use of the additive of my invention in polymer non-dispersed drilling fluids, weighted or unweighted, will retain their desirable characteristics in drilling environments previously considered unsuitable for such muds and thus permit their use on a greatly enlarged scale by the industry.

The term "alkali metal salts" as used herein is intended to include the ammonium or amine salts of the acid involved. Also it is to be understood that I consider the free acid in the case of the additive, the fluid loss control material (sodium polyacrylate) and the flocculant (high mol wt polyacrylate copolymer) to be equivalent to the corresponding alkali metal salts.

I claim:

1. A conventional polymer non-dispersed low solids aqueous drilling fluid having incorporated therein an additive selected from the group consisting of triamino dihexylene pentakis methylene phosphonic acid and tetramino trihexylene hexakis methylene phosphonic acid, the alkali metal salts of said acids and mixtures thereof, said additive being present in an amount effective to render said fluid stable to contamination by soluble calcium and salts.

2. The drilling fluid of claim 1 in which an alkali metal salt of a low molecular weight polyacrylate (not more than about 100,000) is employed as a fluid loss control material.

3. The drilling fluid of claim 2 wherein said additive is employed in a concentration of from about 0.05 to 0.5 lb/barrel.

4. The drilling fluid of claim 2 wherein said additive is a mixture of the two acids having a larger amount of the triamino dihexylene pentakis methylene phosphonic acid.

5. The drilling fluid of claim 3 wherein said additive contains the two acids in a ratio of from about 3 moles of the triamino dihexylene pentakis phosphonic acid to about 1 mole of the tetramino trihexylene hexakis methylene methylene phosphonic acid.

6. The drilling fluid of claim 2 in which said alkali metal salt is present in an amount corresponding to from about 0.1 to about 2.0 lbs/barrel.

7. A method of drilling a well in a formation containing components that normally impart abnormal viscosity to conventional polymer non-dispersed low solids mud, comprising circulating in said well, while drilling, the drilling fluid of claim 1.

8. A method of drilling a well in a formation containing anhydrite and inorganic chlorides in an amount sufficient to produce an abnormally high viscosity in a conventional polymer non-dispersed low solids drilling fluid, comprising circulating in said well, while drilling, the drilling fluid of claim 2.

9. A method of drilling a well in a formation containing anhydrite and inorganic chlorides in an amount sufficient to produce an abnormally high viscosity in a conventional polymer non-dispersed low solids drilling fluid, comprising circulating in said well, while drilling, the drilling fluid of claim 4.

10. A method of drilling a well in a formation containing anhydrite and inorganic chlorides in an amount sufficient to produce an abnormally high viscosity in a conventional polymer non-dispersed low solids drilling fluid, comprising circulating in said well, while drilling, the drilling fluid of claim 5.

* * * * *

UNITED STATES PATENT OFFICE
CERTIFICATE OF CORRECTION

PATENT NO. : 3,880,764
DATED : April 29, 1975
INVENTOR(S) : James E. Donham

It is certified that error appears in the above-identified patent and that said Letters Patent are hereby corrected as shown below:

Column 1, line 17, the word "drillng" should read --drilling--.

Column 6, line 15, before the word "phosphonic" insert --methylene--.

Column 12, Claim 5, line 6, before the word "phosphonic" insert --methylene--; line 8, delete "methylene" (first occurrence).

Signed and Sealed this fourth Day of November 1975

[SEAL]

Attest:

RUTH C. MASON
*Attesting Officer*

C. MARSHALL DANN
*Commissioner of Patents and Trademarks*